Oct. 15, 1957  V. SIPOVIC  2,809,668
INSULATED HOSE
Filed June 28, 1956
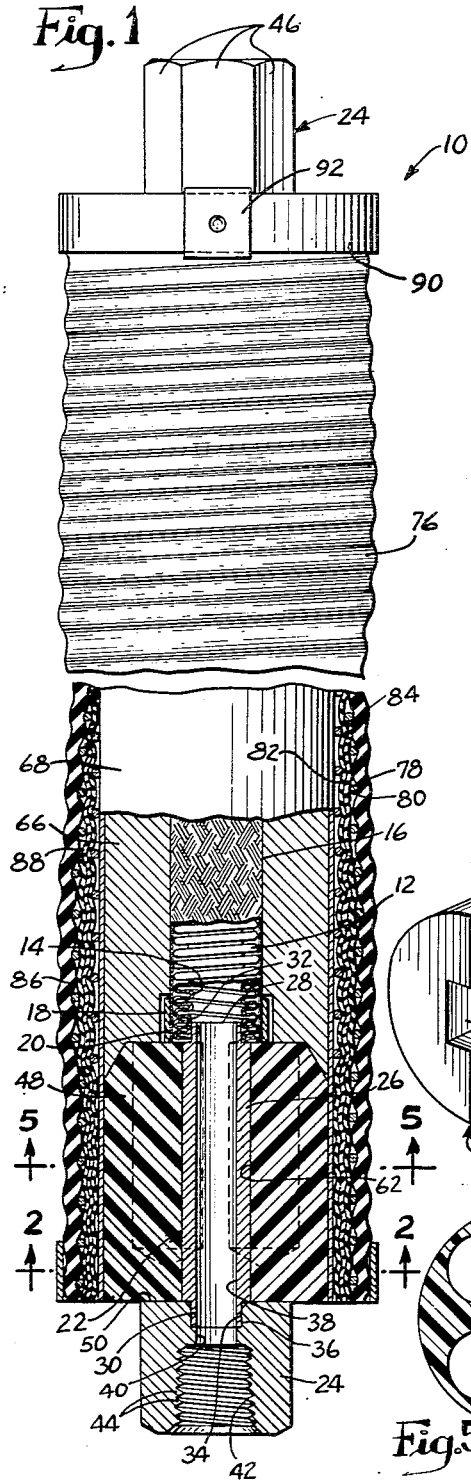
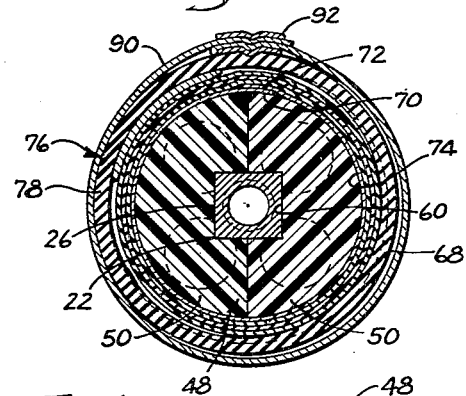
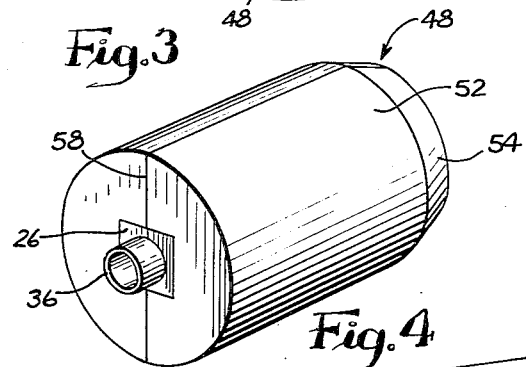
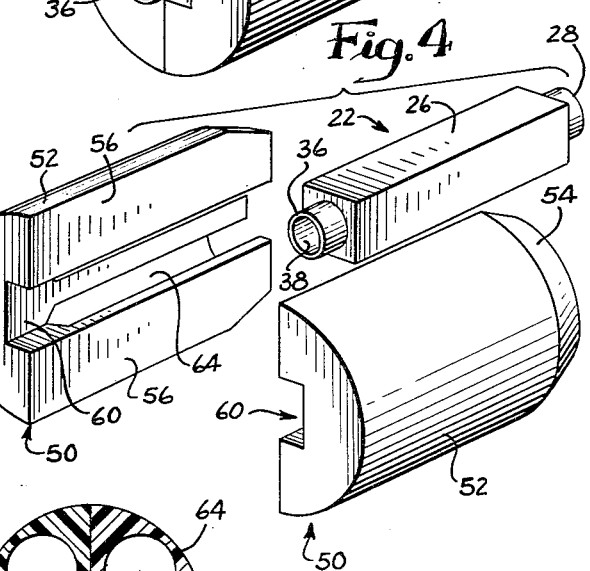
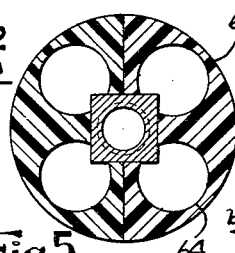
Inventor
VICTOR SIPOVIC
by: Ooms, McDougall
Williams & Hersh
Attys.

2,809,668
INSULATED HOSE

Victor Sipovic, Westchester, Ill., assignor to DK Manufacturing Company, Inc., a corporation of Illinois Application June 28, 1956, Serial No. 594,588

5 Claims. (Cl. 138—58)

This invention relates to insulated hoses or flexible conduits. Such hoses find one important application in the carrying of liquid oxygen or the like, for example.

One object of the present invention is to provide a new and improved insulated hose that is extremely flexible, very well insulated, and unusually resistant to external abrasion and other types of externally caused mechanical damage.

A further object is to provide an insulated hose that will be adequately flexible, even at extremely low atmospheric temperatures, and even when used to carry extremely cold liquids, such as liquid oxygen or the like.

Another object is to provide an insulated hose that is extremely resistant to abrasion, such as may be caused by dragging the hose along a surface made of concrete or other rough material.

It is a further object to provide an insulated hose that is extremely resistant to damage from twisting, such as might be caused by turning the end of the hose with a wrench to couple the hose to some device adapted to dispense or receive liquid oxygen or the like.

A further object is to provide an insulated hose that may be coupled with a wrench without substantial danger of damaging the hose.

Another object is to provide an insulated hose having a smooth outside surface that is free from any sharp points or edges which might injure the hands of a workman.

A further object is to provide a new and improved insulated hose that will remain free of such sharp points and edges, even after long and hard wear.

Further objects and advantages of the present invention will appear from the following description, taken with the accompanying drawings, in which:

Fig. 1 is an elevational view of an insulated hose unit constituting an illustrative embodiment of the present invention, the view being partly in longitudinal section.

Fig. 2 is a cross sectional view, taken generally along a line 2—2 in Fig. 1.

Figure 3 is a perspective view showing the assembly of a bushing and a pair of semi-circular blocks employed in each end of the hose.

Fig. 4 is an exploded perspective view of the bushing and the blocks.

Fig. 5 is a cross sectional view taken through the bushing and the blocks, generally along a line 5—5 in Fig. 1.

As already indicated, Fig. 1 illustrates an insulated hose 10 which is adapted to be employed for transferring extremely cold liquids, such as liquid oxygen or the like. Such hoses have numerous uses. For example, they are employed in transferring liquid oxygen from a large storage tank to a liquid oxygen tank on an airplane. Liquid oxygen is employed in many military airplanes to provide oxygen to be breathed by the pilot and crewmen at high altitudes.

It will be seen that the illustrated hose 10 comprises a flexible, convoluted metal conduit 12 which forms the core of the hose and actually carries the liquid oxygen or the like. The conduit 12 is made of convoluted metal in order that it may retain its flexibility and durability at the extremely low temperature to which it is cooled by the liquid oxygen. The illustrated conduit 12 is formed with a series of generally annular convolutions 14 which extend around the periphery of the conduit. As shown, the convolutions 14 are spiral or helical in form, but they might equally well be parallel and truly annular.

In the illustrated hose 10, a sheath 16, made of braided wire, is disposed around the convoluted metal conduit 12. The conduit 12 fits snugly within the braided sheath 16. The sheath 16 protects the conduit 12 from any externally caused mechanical damage. Moreover, the sheath 16 provides resistance to longitudinal stretching of the convoluted conduit 12. It will be understood that the conduit 12 is quite springy and would be subject to such stretching, due to fluid pressure in the conduit, were it not for the braided sheath 16. The sheath also prevents the insulating material, described below, from entering the spaces between the adjacent convolutions 14. If the insulating material were allowed to enter the spaces, the flexibility of the convoluted conduit 12 would be impaired.

At each end of the conduit 12, a cylindrical ferrule 18 is closely fitted around the end of the sheath 16 to clamp the sheath against the outside of the conduit and prevent the sheath from raveling or fraying. A brazed or soldered joint 20 may be formed to provide a rigid union between the ferrule 18 and the sheath 16, and between the ends of the sheath 16 and the convoluted metal conduit 12. The brazed joint 20 may be formed by flowing molten brazing metal between the ferrule 18 and the conduit 12.

In order that connections may be made to the ends of the convoluted metal conduit 12, a bushing 22 is mounted in each end of the conduit, and an end fitting 24 is connected to the outer end of each bushing. The illustrated bushing 22 is formed with a body portion 26 having a cross section which is square or of some other non-circular shape. Cylindrical end portions 28 and 30 are formed at the opposite ends of the body portion 26. The end portion 28 is snugly received within the convoluted metal conduit 12 and is secured therein by a brazed or soldered joint 32, which may be formed at the same time as the brazed joint 20, by flowing molten brazing into the space between the convoluted conduit 12 and the cylindrical stub 28. The other cylindrical end portion 30 is mounted in an axial bore 34 formed in the end fitting 24. Here again, a brazed joint 36 may be formed between the cylindrical end portion 30 and the bore 34.

An axial bore 38 extends longitudinally through the bushing 22. The bore 38 communicates with an axial bore 40 formed through the end fitting 24. It will be seen that the bore 40 is a reduced extension of the bore 34. The lower end of the bore 40 opens into an enlarged counterbore 42 which is internally threaded with tapered pipe threads 44. Thus, the end fitting 24 is adapted to be coupled to an externally threaded pipe fitting or the like. To facilitate such coupling, the end fitting 24 is made with a cross section which is hexagonal as shown, or of some other shape adapted to be gripped by a wrench. Thus, the illustrated end fitting 24 is provided with six wrench flats 46.

In the illustrated hose 10, an end sleeve 48 is mounted on each of the bushings 22, between the end of the convoluted metal conduit 12 and the end fitting 24. It will be seen that the end fitting 24 is enlarged, with respect to the bushing 22, so as to present an end face 50 adapted to retain the sleeve 48 against outward movement. Inward movement of the sleeve 48 is restrained by the ends of the convoluted conduit 12, the sheath 16 and the ferrule 18. Thus, the sleeve 48 is confined endwise between the end of the conduit 12 and the end fitting 24.

The illustrated end sleeve 48 is formed in two longitudinally split parts in the form of blocks 50 of generally semi-circular cross section. Thus, each block 50 has an outer surface 52 which is substantially semi-cylindrical in shape. A tapered, frusto-conical portion 54 is formed at the inner end of each block 50. The blocks have diametrically extending faces 56 which abut together and are united by a cemented joint 58.

Each of the blocks 50 is formed with an axial recess 60 corresponding in shape to one half of the body portion 26 on the bushing 22. Thus the recesses 60 on the two blocks 50 are complementary in character and, when combined, are adapted to define an axial opening 62 in the sleeve 48. The non-circular body portion 26 of the bushing 22 is snugly received in the opening 62. The non-circular shape of the bushing 22 and the corresponding non-circular shape of the opening 62 prevent any relative rotation between the bushing and the sleeve 48. Since the bushing is rigidly connected to the convoluted conduit 12 and the end fitting 24, the sleeve 48 is held against any relative rotation with respect to the conduit and the end fitting. In this regard, it may be noted that the end fitting 24 may be formed integrally with the bushing 22, if this is desired.

The bushing 22 and the end fitting 24 are preferably made of metal. On the other hand, the blocks 50, making up the sleeve 48, are preferably made of a strong, thermally insulating material, such as a fiber reinforced plastic. To enhance the insulating value of the blocks 50, it is preferred to form voids 64 therein. The illustrated voids 64 are in the form of longitudinal bores extending partway through each block, from the inner end toward the outer end.

Thermally insulating material 66 is also provided around the convoluted metal conduit 12. Various insulating materials may be employed, but glass fiber wool is preferred, because it has a high insulating value and is superior in its mechanical characteristics. Thus, the glass wool will stay in place around the braided sheath 16 and will not settle toward the lower end of the hose 10 when the hose is used vertically. Moreover, the glass wool will not sift through the braid 16 into the spaces between the convolutions 14. In addition, there is no danger that the wool will get into the convoluted conduit 12, in the event that the conduit springs a leak due to some mechanical damage.

The insulating material 66 is held in place around the convoluted conduit 12 by a wrapper 68 of generally cylindrical form. The wrapper may be made of thin sheet material composed of a suitable plastic, heavy paper or the like. As shown, the wrapper 68 is formed from an elongated strip and is wrapped crosswise around the insulating material 66 and the end sleeves 48. The wrapper has longitudinal edges 70 and 72 which overlap to form a lapped joint. Cement may be employed on the inside of the wrapper 68 to secure the wrapper in place over the insulating material 66 and the end sleeves 48. The location of the cement is indicated at 74. Various types of cement may be employed, but it is preferred to utilize pressure sensitive cement which is applied to the wrapper 68 before it is wrapped around the insulating material 66 and the end sleeves 48. The cement unites the overlapping edges 70 and 72 along the lapped joint therebetween.

Outside the wrapper 68, the hose unit 10 is provided with a protective outer jacket 76 of generally cylindrical form. The illustrated jacket is made of synthetic rubber or rubber-like material and is reinforced with fibrous material. The exact construction of the jacket 76 may be varied to a considerable extent, but the illustrated jacket comprises an outer ply or cover 78 made of synthetic rubber or rubber-like material that will remain flexible and resilient, even at low atmospheric temperatures. Within the cover 78 is a helically wrapped cord 80 made of fibrous material. A ply or layer 82 of fiber-reinforced synthetic rubber or rubber-like material is disposed within the outer cover 78 with the helically wrapped cord 80 therebetween. The inner ply 82 may be of synthetic rubber reinforced with glass fiber. A metal reinforcing wire 84 is helically wrapped on the inside of the inner ply 82. The reinforcing wire 84 may be made of steel or the like. The inner ply 82 and the outer ply 78 are suitably bonded together. It will be seen that the reinforcing wire 84 and the cord 80 are wound with the same pitch but with their turns staggered.

At both ends, the outer jacket 76 is reinforced with two additional plies or layers 86 and 88, both of which may be made of synthetic rubber or rubber-like material reinforced with glass fiber. These additional plies 86 and 88 are interposed between the innermost ply 82 and the cover 78, the helically wrapped cord 80 being disposed between the cover 80 and the ply 86. Of the two extra plies 86 and 88, the inner one 88 is somewhat longer and thus extends a somewhat greater distance from the end of the jacket 76. The extra plies 86 and 88 impart added strength and rigidity to the end portions of the outer jacket 76 so that the jacket will be highly resistant to damage due to bending.

It will be seen that the steel reinforcing wire 84 terminates short of the end of the outer jacket 76. More specifically, the wire 84 terminates just short of the end sleeves 48 so that the inside of the inner ply 82 may be fitted snugly over each of the sleeves 48 with the wrapper 68 therebetween.

At each end of the hose unit 10, the outer jacket 76 is clamped around the end sleeve 48. In the illustrated construction, this is done by mounting a clamping band 90 around each end of the jacket 76. The band 90 is suitably tensioned and is locked by a suitable ferrule 92. Thus, the band 90 squeezes the jacket 76 against the end sleeve 48 with considerable pressure. In this way, the ends of the outer jacket 76 are firmly held against any relative movement with respect to the underlying end sleeves 48.

Any torque that may be applied to either end of the jacket 76 will be transmitted to the corresponding end sleeve 48, and thence to the bushing 22 and the end fitting 24. Thus, there is no danger that the convoluted metal conduit 12 will be twisted off by any torque applied to the outer jacket 76.

In coupling the hose unit 10 to a dispensing or receiving device, the proper procedure is to screw the end fitting 24 onto the terminal fitting on the device. The end fitting 24 may be tightened by applying a wrench to the wrench flats 46 provided thereon. Any rotation thus imparted to the end fitting 24 is transmitted by the bushing 22 and the end sleeve 48 to the outer jacket 76 so that the entire hose will be rotated. The heavy outer jacket 76 is highly resistant to twisting. Thus, there is virtually no danger of twisting off the convoluted metal conduit 12.

The combination of the convoluted inner conduit 12 and the fiber reinforced outer jacket 76 provides a hose unit with adequate flexibility. The convoluted metal conduit 12 remains flexible even when it is employed to carry liquid oxygen or other extremely cold fluids. Likewise, the outer jacket 76 remains flexible, even at extremely low atmospheric temperatures. The insulating material 66 and the insulating end sleeves 48 protect the outer jacket 76 from the extreme cold of the liquid oxygen or the like carried by the inner conduit 12.

The heavy synthetic rubber jacket 76 is extremely resistant to abrasion and mechanical damage. Thus, the hose may be dragged over concrete pavements or other rough surfaces without damage. The fiber-reinforced plies 82, 86 and 88, the helically wrapped cord 80 and the helically wound wire 84 impart added strength to the jacket 76 so that it will effectively resist mechanical damage. Even if the outer cover 78 becomes somewhat worn, it will remain smooth and free from any sharp points or edges that might injure the hands of a workman.

It will be understood that the insulating material 66, the insulated end sleeves 48, and the synthetic rubber jacket 76 minimize the transmission of heat to the convoluted metal conduit 12. Thus, the hose unit may be used to carry liquid oxygen without excessive vaporization. Moreover, the insulating value of the hose prevents excessive condensation and frost formation on the outside of the hose. When the hose is in use carrying liquid oxygen, the end fittings 24 may be wrapped temporarily with insulating material to prevent frost formation on the end fittings.

Various modifications, alternative constructions and equivalents may be employed without departing from the true spirit and scope of the invention as exemplified in the foregoing description and defined in the following claims.

I claim:

1. A flexible hose unit, comprising a flexible convoluted metal conduit, a wire braid sheath closely received around said conduit, a generally cylindrical ferrule mounted around said sheath at each end thereof, a bushing mounted on each end of said conduit and having an elongated non-circular body with a first generally cylindrical end portion secured within said conduit, an enlarged end fitting of non-circular cross section and with a bore therein, said bushing having a second generally cylindrical end portion at the opposite end of said bushing from said first end portion and secured within said bore in said end fitting, end sleeve means of generally circular cross section received around each of said bushings and having an axial opening therein corresponding generally in shape to said non-circular body portion and non-rotatably mounted thereon, each of said sleeve means comprising a plurality of longitudinally split blocks with cemented joints therebetween, said sleeve means being disposed between said inner conduit and said end fitting, a generally cylindrical wrapper wrapped around said sleeve means and having overlapping longitudinal edges defining a longitudinally extending lapped joint, glass fiber insulating material disposed between said wrapper and said sheath on said inner conduit, said wrapper having pressure sensitive cement on its underside for securing said wrapper to said sleeve means and for securing said overlapping longitudinal edges together along said lapped joint, a flexible generally cylindrical jacket closely received around said wrapper, said jacket being made of synthetic rubber-like material reinforced with fibrous material, and tensioned clamping bands around the opposite ends of said jacket for securing said jacket to said sleeve means with said wrapper therebetween.

2. A flexible hose unit, comprising a flexible convoluted metal conduit, a bushing mounted on each end of said conduit and having an elongated non-circular body, end sleeve means of generally circular cross section received around each of said bushings and having an axial opening non-rotatably received on said non-circular body portion, glass fiber insulating material disposed around said inner conduit, a flexible generally cylindrical jacket closely received around said wrapper, said jacket being made of reinforced synthetic rubber-like material, and means securing said jacket to said sleeve means.

3. A flexible hose unit, comprising a flexible convoluted metal conduit, a wire braid sheath closely received around said conduit, a tubular extension mounted on each end of said conduit and having an elongated non-circular body with an enlarged end part thereon of non-circular cross section and with a bore therein, end sleeve means of generally circular cross section received around each of said tubular extensions and having an axial opening therein corresponding generally in shape to said non-circular body portion and non-rotatably mounted thereon, each of said sleeve means comprising a plurality of longitudinally split blocks with cemented joints therebetween, said sleeve means being disposed between said inner conduit and said end part, a generally cylindrical wrapper around said sleeve means, insulating material disposed between said wrapper and said sheath on said inner conduit, said wrapper having cement on its inner side for securing said wrapper to said insulating material and said sleeve means, a flexible generally cylindrical jacket closely received around said wrapper, said jacket being made of synthetic rubber-like material reinforced with fibrous material, and tensioned clamping bands around the opposite ends of said jacket for securing said jacket to said sleeve means with said wrapper therebetween.

4. A hose unit, comprising a flexible inner conduit made of metal and having peripheral convolutions therein, a wire braid sheath around said inner conduit, a pair of elongated metal extension bushings mounted on the opposite ends of said inner conduit, each of said bushings having a longitudinal bore therein, each of said bushings having an elongated body portion of non-circular cross section with generally cylindrical end portions at the opposite ends of said body portion, one of said cylindrical end portions of each bushing being received within said inner conduit with a brazed joint therebetween, a pair of generally cylindrical ferrules closely received around the opposite ends of said sheath with brazed joints therebetween, an enlarged end fitting mounted on each of said bushings at the end thereof opposite from said inner conduit, each of said end fittings being non-circular in cross section and having an axial bore therein with one end portion thereof receiving the opposite cylindrical end portion of said bushings, said bore in said end fitting having an opposite end portion with interal threads therein, a pair of complementary blocks of generally semi-circular cross section mounted around the body portion of each of said bushings, said blocks having axial recesses together defining an axial opening corresponding in shape to and closely receiving said body portion of said bushing, said blocks having radial interengaging faces with cemented joints therebetween, said blocks being made of thermally insulating material and having hollows therein to reduce the thermal conductivity thereof, glass wool insulating material disposed around said sheath between said blocks at the opposite ends of said inner conduit, a generally cylindrical wrapper surrounding said insulating material and said blocks and having longitudinally lapped edges, said wrapper having pressure sensitive cement on the inner side thereof to secure said wrapper to said blocks and said insulating material and to form a bond between said longitudinally lapped edges, a generally cylindrical outer jacket made of synthetic rubber-like material and reinforced with fibrous material, said jacket being disposed around said wrapper in closely surrounding relation thereto, and a tensioned clamping band around each end of said jacket for clamping said jacket against said blocks with said wrapper between said jacket and said blocks.

5. A hose unit, comprising a flexible inner conduit made of metal and having peripheral convolutions therein, a wire braid sheath around said inner conduit, a pair of metal extensions mounted within the opposite ends of said inner conduit, each of said extensions having an elongated body portion of non-circular cross section and an enlarged non-circular end fitting mounted on the outer end thereof, a pair of complementary blocks of generally semi-circular cross section mounted around the body portion of each of said extensions, said blocks having axial recesses together defining an axial opening corresponding in shape to and closely receiving said body portion, said blocks having radial interengaging faces with cemented joints therebetween, said blocks being made of thermally insulating material, insulating material disposed around said sheath between said blocks at the opposite ends of said inner conduit, a generally cylindrical wrapper secured around said insulating material and said blocks, a generally cylindrical outer jacket disposed around said wrapper in closely surrounding relation thereto, and a tensioned clamping band around each end of said jacket for clamping said jacket against said blocks with said wrapper therebetween, said jacket having an outer ply of rubber-like material, an inner ply of rubber-like material reinforced with glass fiber, a helically wrapped cord between said plies, and a steel wire wound helically within said inner ply.

References Cited in the file of this patent
UNITED STATES PATENTS
1,649,139    Sonen _____ Nov. 15, 1927